United States Patent Office 3,481,704
Patented Dec. 2, 1969

---

3,481,704
PROCESS FOR THE PREPARATION OF NITROSYL CHLORIDE
Franciscus J. F. van der Plas, Amsterdam, Netherlands, assignor to Shell Oil Company, New York, N.Y., a corporation of Delaware
No Drawing. Filed June 27, 1966, Ser. No. 560,803
Int. Cl. C01b *21/52, 9/02*
U.S. Cl. 23—203                 6 Claims

ABSTRACT OF THE DISCLOSURE

Nitrosyl chloride is prepared by contacting a nitrogen-containing compound, such as nitric acid, with a chlorine-containing compound, such as hydrogen chloride, and with sulfur or hydrogen sulfiide, at specified temperatures and ratios of nitrogen-containing compound to chlorine-containing compound.

---

The present invention relates to an improved process for the preparation of nitrosyl chloride.

Nitrosyl chloride is a very reactive compound, and has been used as chlorinating and/or nitrosating agent. Importantly, it is being increasingly used as a reaction component in various chemical processes, such as in the preparation of the herbicide 2,6-dichlorobenzonitrile from 6-chloro-2-nitrotoluene, and in the production of caprolactam, a precursor for synthetic fibers, from cyclohexane followed by a Beckmann rearrangement.

Although numerous methods are known for the synthesis of NOCl, they leave much to be desired, particularly with regard to a simple and economic mode of preparing the required large quantities of this material. The synthesis of NOCl from NO and Cl₂, often used on a laboratory scale, is not commercially feasible, because, even apart from the high costs involved, NO is hard to obtain in the required large quantities. The known mode of preparing NOCl from HNO₃ and HCl, on the other hand, has the drawback that considerable quantities of chlorine are formed as well, according to the equation $$3HCl + HNO_3 \rightarrow NOCl + Cl_2 + 2H_2O \qquad (1)$$

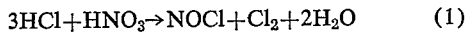

while the separation of NOCl and Cl₂ requires a time-consuming and costly treatment of the gas mixture obtained.

According to the German "Auslegeschrift" 1,173,441, NOCl is prepared by reacting gaseous NO₂ with hydrochloric acid according to the equation $$2NO_2 + HCl \rightarrow NOCl + HNO_3 \qquad (2)$$

However, since this reaction results in half of the original quantity of NO₂ getting lost in the form of the by-product HNO₃, the actual yield of NOCl can even under optimum conditions never be more than 50% of the theoretical yield.

Finally, a frequently used method is the reaction of nitrosylsulfuric acid with HCl (or NaCl), for example according to:

$$HOSO_2ONO + HCl \rightarrow NOCl + H_2SO_4 \qquad (3)$$

In this reaction, the required nitrosylsulfuric acid is invariably prepared beforehand and then converted with HCl or NaCl. These syntheses through the nitrosylsulfuric acid intermediate are thus all 2-stage processes, and they differ mainly by the way in which the nitrosylsulfuric acid is prepared, for example, from SO₂ and HNO₃ (see, e.g., Inorganic Syntheses, vol. I, p. 55), or from N₂O₃ and oleum (see, e.g., French Patent 1,342,566, German "Auslegeschrift" 1,182,215 and British Patent 993,189).

It is therefore an object of the present invention to provide a process for the preparation of nitrosyl chloride in which the drawbacks of the known processes are avoided, and in which nitrosyl chloride can be prepared in a single step in a simple and economically attractive way.

In accordance with the present invention, it has now been found that when nitric acid, formed in situ or otherwise, and/or a nitrogen oxide, in which the nitrogen is at least trivalent, is reacted with hydrogen chloride, or a metal or ammonium salt thereof, and sulfur or hydrogen sulfide, that nitrosyl chloride can be obtained in good yield and high purity.

Contrary to expectations, little, if any, chlorine is formed as by-product. Small quantities of chlorine, which may be present in the HCl formed, usually amount to not more than 5% by volume and can in general be neglected.

The nitrogen source used for the preparation of the NOCl may be nitric acid and/or a nitrogen oxide. In a preferred embodiment of the invention, aqueous solutions of nitric acid are employed in a concentration of from 20 to 100% by weight NHO₃, with acid concentrations of from about 50 to about 70% being particularly preferred. If desired, however, the nitric acid can also be formed in situ, for example, from a salt derived therefrom, such as NaNO₃; or preferably by reacting NO₂ with hydrochloric acid and sulfur or hydrogen sulfide. The HNO₃ formed according to the above reaction equation (2) then reacts under these reaction conditions to form NOCl and H₂SO₄.

The process according to the invention therefore permits a complete conversion of the original NO₂ to the desired end product. Furthermore, the possibility is not precluded that also other reaction mechanism are involved. For example, it is known that NO₂ reacts with hydrogen chloride in the following way:

$$NO_2 + 2HCl \rightarrow NOCl + \tfrac{1}{2}Cl_2 + H_2O \qquad (4)$$

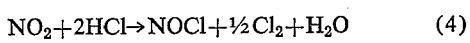

However, since under the conditions of the new reaction hardly if any chlorine is liberated, it may be assumed that the chlorine reacts in situ with the sulfur or the relative S-compound present according to the invention, to form H₂SO₄ with regeneration of HCl. A similar situation occurs, if the NO₂ is replaced by HNO₃ (see reaction 1).

In addition to the aforementioned NO₂, which compound is suitable as a nitrogen source for the NOCl to be prepared, other nitrogen oxide may be used, such as N₂O₃, N₂O₄ and/or N₂O₅; in general, any nitrogen oxides in which the valency of the nitrogen atom is at least 3 may be employed. Preferred oxides are NO₂ and/or N₂O₃, or a mixture of about equimolar quantities of NO₂ and NO, which, for example, is readily accessible by catalytic oxidation of NH₃.

The reaction component acting as source for the Cl-atom is preferably HCl. Good results are also obtained when the HCl is fully or partly replaced by chlorine. The fact that, as desired, one may use either HCl or chlorine, or a HCl/Cl₂ mixture, is particularly advantageous, because it renders the process flexible and readily adaptable to the local conditions with respect to availability of the required quantities of base material in question. If desired, also salts of HCl can be used, particularly NH₄Cl and metal salts, for example alkali and alkaline-earth metal chlorides, in particular NaCl and KCl.

The relative quantities of the above N-containing and Cl-containing compounds, for example, of HNO₃ or a nitrogen oxide on the one hand, and HCl or Cl₂ on the other, which are reacted together with sulfur or hydrogen sulfide, are usually chosen so that the atomic ratio N:Cl is between about 0.8 and 1.6, preferably between about 1 and 1.2. A large excess of the Cl-containing reaction component should in general be avoided, in order to prevent contamination of the reaction product with chlorine or HCl as much as possible.

Finally, an essential requirement for the new process is the presence of sulfur and/or hydrogen sulfide. Sulfur, however, is preferred, and may be employed, for example, in the molten state, or in the form of flowers of sulfur, or even better, as ground sulfur with a particle size of, for example 20–40 mesh (ASTM). In this last-mentioned form, sulfur yields far more readily a homogeneous suspension than flowers of sulfur. The sulfur or hydrogen sulfide may be added to the reaction mixture directly, or it may be formed in situ.

Favorable results are obtained when the quantities of sulfur or hydrogen sulfide and of hydrogen chloride or chlorine are chosen such that for each S atom, about 1 to 4 Cl atoms are present. For example, when $H_2S$ is employed, an atomic ratio of Cl:S of about 4:1 is favorable; when elemental sulfur is used, an atomic Cl:S ratio of about 3:1 is preferably employed.

Although the course of the reaction is probably complex, and not yet quite clear, some reaction equations are, by way of illustration, given below which represent the presumable stoichiometric conversions for a number of cases:

$$3HCl + 3HNO_3 + S \rightarrow 3NOCl + H_2SO_4 + 2H_2O \quad (5)$$

$$Cl_2 + 2HNO_3 + S \rightarrow 2NOCl + H_2SO_4 \quad (6)$$

$$2NaCl + HCl + 3HNO_3 + S \rightarrow 3NOCl + Na_2SO_4 + 2H_2O \quad (7)$$

$$4HCl + 4HNO_3 + H_2S \rightarrow 4NOCl + H_2SO_4 + 4H_2O \quad (8)$$

As appears from these reaction equations, a by-product formed in these cases is $H_2SO_4$ or a salt thereof. It has now been found particularly advantageous to start the conversion direct in a sulfuric acid medium. For example, concentrated $HNO_3$ may be fed with stirring into a suspension of sulfur in dilute $H_2SO_4$, a stream of gaseous HCl being led simultaneously into the reaction mixture. Although the reaction can be very well performed in a nonaqueous medium, it is often advantageous to effect the conversion in the presence of water. At a content of about 0–70 percent by weight of water, particularly about 30–60 percent by weight, calculated on the liquid reaction mixture, very favorable results are obtained.

The reactions according to the invention proceed in general at temperatures of from about 10 to 150° C. Preferably, temperatures above 80° C. and below the boiling point of the reaction mixture are used, with temperatures of between about 100 and 130° C. being particularly preferred. The pressure is usually atmospheric or slightly higher, for example 0–5 atmospheres absolute; higher or lower pressures are not precluded, however.

The process can be performed batchwise, but preferably continuously, for example under steady-state conditions.

A preferred aspect of the present invention is the combination of the NOCl preparation according to the new process with processes which themselves are known, such as the preparation of the nitrosocyclohexane, the precursor of caprolactam, by reacting the NOCl with cyclohexane; and especially the one-step synthesis of aromatic nitriles, particularly of 2,6-dichlorobenzonitrile, from aromatic compounds with one or more groups of the structure —$CH_2R$, in which R may be for example an H atom, a methyl group or a halogen atom, by reaction with the NOCl obtained, in the presence of pyridine or homologues thereof. As appeared from comparative experiments performed under similar conditions, the yield of 2,6-dichlorobenzonitrile from 6-chloro-2-nitrotoluene was 60 mole percent when using NOCl prepared from HCl, $HNO_3$ and S, against only 55 mole percent when using the mixture of NOCl and $Cl_2$ obtained from HCl and $HNO_3$.

The following examples are given for illustrative purposes only, and are not intended in any way to limit the invention.

EXAMPLE I (a) In a 500-ml. reaction vessel, 100 grams of ground and sieved sulfur with a particle size of 20–40 mesh (ASTM) was added with stirring to 350 ml. of 25% $H_2SO_4$, after which the suspension thus obtained was heated to 105–110° C. Subsequently, at this temperature, gaseous HCl was passed with continuous stirring via a dip pipe into the mixture at an average rate of 38.3 grams HCl per hour, while simultaneously 60% $HNO_3$ was pumped into the reactor at an average rate of 66.5 ml. per hour (91.1 g./h.) (atomic ratio Cl:N about 1.2:1). In addition, 210 grams of sulfur was added batchwise for 25 hours at intervals of 5–6 hours.

The liquid volume in the reactor was kept constant by means of a siphoning device through which the discharging liquid left the reactor at an average rate of 75.5 g./h. The end of the discharge tube dipping into the reaction mixture was provided with a glass filter to keep the sulfur in the reactor. Analysis of the discharging liquid gave 11.4% by weight of S, 4.5% by weight of Cl and 0.23% by weight of N, while the acidity was 8.58 milliequivalent of acid/gram.

To remove entrained water the gas formed was passed through a cooler, where it was cooled to about 15° C. According to gas-chromatographic analysis the gas mixture thus obtained contained about 94% by volume of NOCl, and at most 6% by volume of $Cl_2$ in addition to other contaminants. According to the analytical data the yield of NOCl was 98.5 mole percent, calculated on $HNO_3$ fed in. In this way NOCl was prepared which was used directly for the preparation of 2,6-dichlorobenzonitrile from 6-chloro-2-nitrotoluene (see (b) below).

(b) A 500 ml. reaction vessel, provided with a reflux condenser which, to remove water of reaction, was connected to a water separator, was charged with 500 grams of 6-chloro-2- nitrotoluene (2.92 moles) after which a stream of the NOCl prepared under (a) was fed in at 160° C. at a rate of 0.88 mole of NOCl per hour. During this operation the temperature was kept at 160° C. for five hours, then at 170° C. for 15 hours and finally at 175° C. for five hours, while 42 ml. of pyridine was pumped continuously into the reaction mixture, 10 ml. at the beginning and after ten hours for half an hour each, respectively, and 0.91 ml. per hour for the remaining 24 hours. Then the stream of NOCl was replaced by chlorine, which was passed at 185° C. for five hours at a rate of 0.45 mole of $Cl_2$ per hour into the mixture, to convert the 6-chloro-2-nitrobenzonitrile formed as a by product into the desired 2,6-dichlorobenzonitrile. 556 grams of product was obtained, which according to the gas-chromatographic analysis contained 59% of 2,6-dichlorobenzonitrile. The yield was therefore 65.6 mole percent.

An experiment performed under the same conditions, in which use was made, however, of a mixture of NOCl and chlorine obtained by conversion of hydrogen chloride with nitric acid, i.e., in the absence of sulfur, gave a yield of only 55 mole percent.

EXAMPLE II

In a manner similar to that described in Example I(a), 100 grams of ground and sieved sulfur were suspended in 405 ml. of 30% $H_2SO_4$ heated to 80–85° C., and reacted at this temperature with HCl and $HNO_3$, which were fed in at a average rate of 36.5 grams of gaseous HCl per hour and 77 ml. of 55% $HNO_3$ per hour (atomic ratio Cl:N about 1.1:1). An analysis after the five hours' reaction period of the liquid, which left the reactor at a rate of 94 p./h., gave 1.37% by weight N and 5.45% by weight Cl; the acidity was 8.10 milliequivalents of acid per gram.

According to the gas-chromatographic analysis the gas obtained consisted of about 97% by volume NOCl and about 3% by volume chlorine. The yield of NOCl according to the analytical data was 90 mole percent calculated on HNO₃.

EXAMPLE III

In a manner similar to that described in Example II, but with chlorine instead of hydrogen chloride, 100 grams of sulfur with an average 27 grams of chlorine per hour and 71 ml. of 60% HNO₃ per hour (atomic ratio Cl:N about 0.82:1) was reacted at a temperature of 105–110° C. The gas analyzed after three hours consisted of about 94% by volume NOCl and about 6% by volume chlorine. The yield of NOCl was 75 mole percent.

EXAMPLE IV

In a manner similar to that described in Example II, but with NaCl instead of HCl, and with 400 ml. of an aqueous 22% solution of Na₂SO₄ instead of H₂SO₄, 100 grams of sulfur was reacted with 174 ml./h. of an aqueous 25% solution of NaCl and on an average 175 ml./h. of 60% HNO₃ at a temperature of 106–107° C. (atomic ratio Cl:N about 0.92). The composition of the gas analyzed after 4½ hours was about 87% by volume NOCl and about 13% by volume chlorine. The yield of NOCl calculated on HNO₃ was about 24–30 mole percent.

EXAMPLE V

In a manner similar to that described in Example II, but in which the sulfur was replaced by H₂S, an average of 8 g./h. of H₂S, 31 g./h. of HCl and 64 ml. of 60% HNO₃/h. were passed simultaneously into 400 ml. of 25% H₂SO₄ with stirring at a temperature of 100–110° C. (atomic ratio Cl:N about 1.04:1). The gas analyzed after five hours comprised 62% by volume NOCl, 3% by volume HCl and 5% by volume chlorine. The yield of NOCl calculated on HNO₃ was about 90 mole percent.

I claim as my invention:

1. A process for the preparation of nitrosyl chloride which comprises contacting a nitrogen-containing compound selected from the group consisting of nitric acid, oxides of nitrogen wherein the nitrogen is at least trivalent, and mixtures thereof with a chlorine-containing compound selected from the group consisting of chlorine, hydrogen chloride, the chloride salts of alkali metals, and the chloride salts of alkali earth metals and with a sulfur-containing reactant selected from the group consisting of sulfur and hydrogen sulfide, the atomic ratio of the nitrogen-containing compound to the chlorine-containing compound being between about 0.8 and 1.6, at a temperature of between about 10° C. and 150° C., and then freeing the evolving nitrosyl chloride of water contamination by cooling sufficiently to condense water vapor contamination.

2. A process in accordance with claim 1 wherein the nitrogen-containing compound is nitric acid and the chlorine-containing compound is hydrogen chloride.

3. A process in accordance with claim 1 wherein the atomic ratio of the nitrogen-containing compound to the chlorine-containing compound is between about 1 and 1.2.

4. A process in accordance with claim 1 wherein the temperature is between about 100° C. and 130° C.

5. A process in accordance with claim 1 wherein ground sulfur is used.

6. A process in accordance with claim 1 wherein the contacting takes place in a sulfuric acid medium.

References Cited

UNITED STATES PATENTS

| | | | |
|---|---|---|---|
| 3,069,233 | 12/1962 | Marullo et al. | 23—203 |
| 3,336,110 | 8/1967 | Ito et al. | 23—203 |
| 3,338,887 | 8/1967 | Ito et al. | 23—203 X |

OSCAR R. VERTIZ, Primary Examiner

E. C. THOMAS, Assistant Examiner